A. SIDDALL.
ATTACHMENT APPLICABLE FOR SUPPORTING PICTURES AND OTHER ARTICLES.
APPLICATION FILED NOV. 29, 1907.
Patented May 11, 1909.
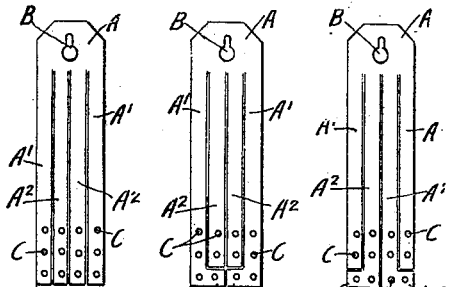
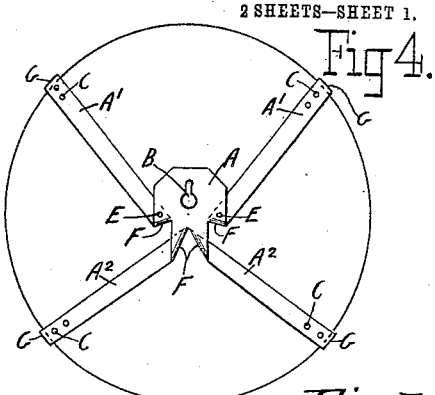
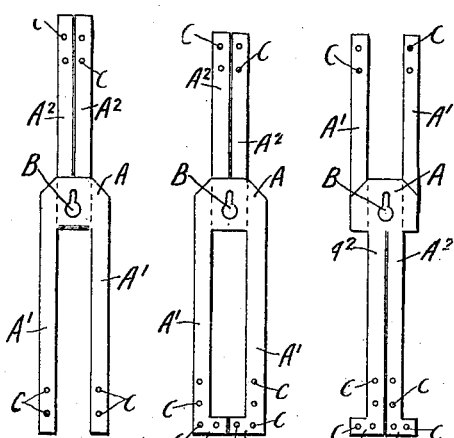
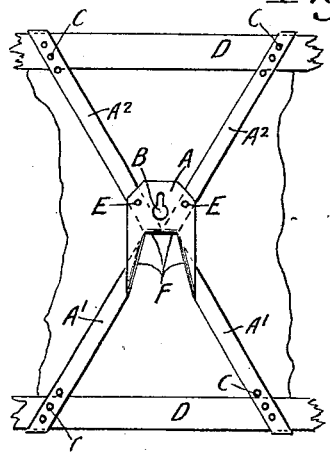
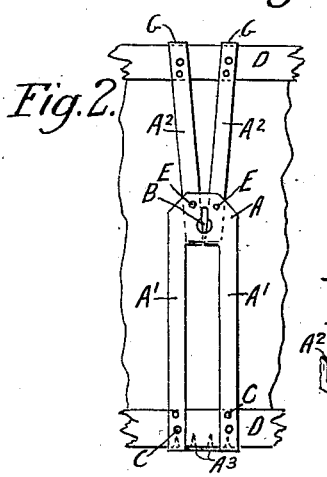
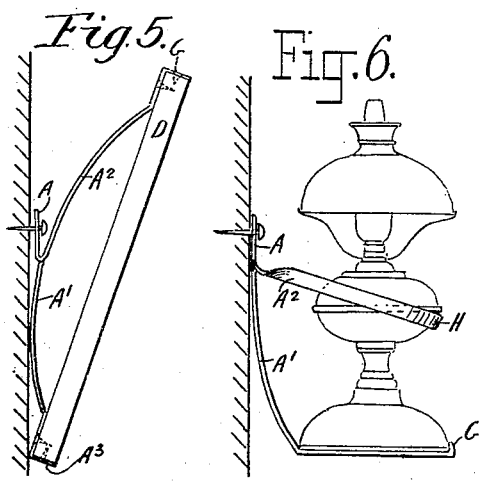

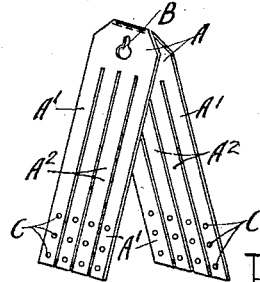
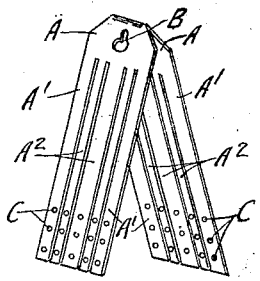
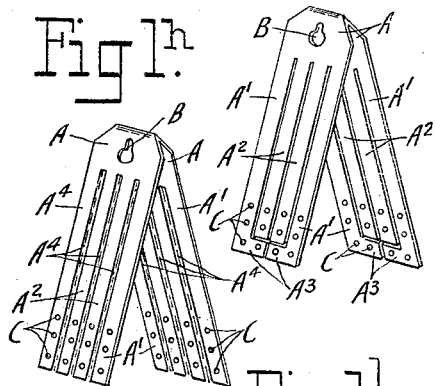
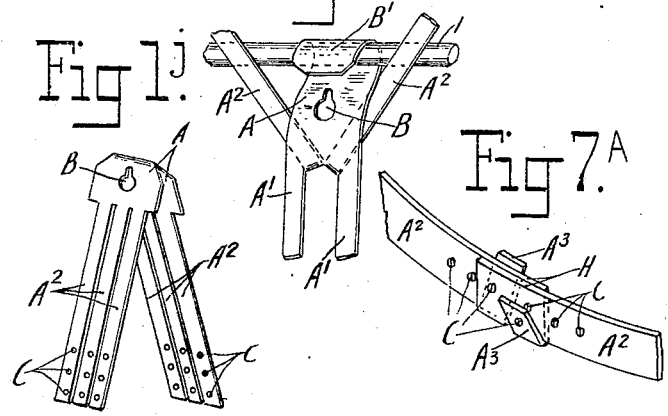
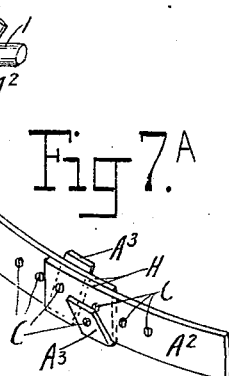

UNITED STATES PATENT OFFICE.

ARCHIBALD SIDDALL, OF BONDI, SYDNEY, NEW SOUTH WALES, AUSTRALIA.

ATTACHMENT APPLICABLE FOR SUPPORTING PICTURES AND OTHER ARTICLES.

No. 921,472.  Specification of Letters Patent.  Patented May 11, 1909.

Application filed November 29, 1907. Serial No. 404,397.

*To all whom it may concern:*

Be it known that I, ARCHIBALD SIDDALL, a citizen of the Commonwealth of Australia, residing at No. 47 Penkivil street, Bondi, Sydney, in the State of New South Wales, in the Commonwealth of Australia, bank clerk, have invented certain new and useful Improvements in Attachments Applicable for Supporting Pictures and other Articles; and I do hereby declare the following to be a full, clear, and exact description of the invention, such as will enable others skilled in the art to which it appertains to make and use the same.

This invention relates to a device (which may be simply and cheaply constructed of flexible material) to be used as a rearward or hidden attachment to articles requiring to be suspended, as in the case of framed goods, pictures, plaques, mirrors, photo-frames, or other kinds of articles adapted to be similarly supported. The flexible materials suitable for the purpose may be leather, sheet rubber, celluloid, paper, or woven fabric, likewise sheet and band metal, the choice of the material being governed by the size, weight, and kind of article to which the device is to be applied.

The primary feature of the invention consists in converting one or more strips of the flexible material into any desired number of strips or bands, which may be subsequently disposed in certain relative positions suitable for producing a suspending device of the necessary form, to be used as an attachment to the article requiring to be supported.

The multiversant character of the device necessarily depends upon the width of the convertible strip of flexible material to be used in the first instance, as it must be divisible into the required number of bands of the suitable widths and shapes serviceable for a particular purpose, and whatever character of design be decided upon, the convertible strips would have to be shaped accordingly. By this means a combination of useful parts is obtainable to produce a variety of forms, each self-contained in the convertible strip, the combination comprising a pierced head piece by which the device is suspended, one or more strips or bands to be turned upwardly behind the head piece, and one or more strips or bands which run either downwardly, laterally, or diagonally from the head piece, the whole of the strips or bands being available to be either bent, folded, or twisted and placed in certain relative positions as may be required to produce a particular form of attachment. The respective parts or strips in the combination are pierced lengthwise, and provide means for making the necessary attachment to the article to be suspended or supported. Other means of fastening are also provided, by bending the ends of the strips so as to hook on to, or clasp, the article. The pierced head piece is adapted for hanging on a nail or hook. If, however, it be bent hook shape, it will accommodate itself to a rod or wall attachment.

Referring to the drawings which form a part of this specification: Figure 1 shows, in elevation, a convertible strip, whose head piece is combined with multiplicate strips produced by a series of parallel cuts. Fig. 1$^a$ shows, in elevation, the disposition of the multiplicate strips in Fig. 1, to form a suspending device. Figs. 1$^b$ and 1$^d$ show, in elevation, the same externally shaped strip as in Fig. 1, but with transverse cuts in combination with parallel cuts, to vary the shapes of the multiplicate strips. Figs. 1$^c$ and 1$^e$ show, in elevation, the disposition of the multiplicate strips, as arranged in Figs. 1$^b$ and 1$^d$ respectively. Fig. 1$^f$ is a perspective of a suspending device, shown partially folded for clearness, having multiple strips of equal length; Fig. 1$^g$ is a similar perspective view, but with multiple strips of unequal width; Fig. 1$^h$ is a similar perspective view, but showing slits widened to form gaps; Fig. 1$^j$ is a similar perspective view, but showing side gaps, leaving the head piece wider than the multiple strips; Fig. 1$^k$ shows a partially folded single strip similar in shape to Fig. 1$^b$. Fig. 1$^l$ shows a pierced head piece provided with hook for rod or wall attachment. Fig. 2 shows, in elevation, the convertible strip as in Fig. 1, with the parts relatively disposed so as to form an attachment to a framed article. Fig. 3 shows, in elevation, the same convertible strip as in Fig. 2, with the parts somewhat differently disposed as an attachment to a framed article. Fig. 4 shows, in elevation, the same convertible strip as in Figs. 1, 1ª, 2, and 3, adapted as an attachment to a circular article, such as a plaque. Fig. 5 shows a side elevation of a framed article, with head piece of attachment hung on a nail. Fig. 6 shows a side elevation of the attachment applied to supporting a lamp. Fig. 7 shows the method of forming a loop in the attachment as in Fig. 6. Fig. 7ª is an enlarged detail of Fig. 7, showing ends partially folded, and the holes which coincide.

The drawings illustrate a simple mode of constructing the convertible strip by adhering to a rectangular formation, but the substitution of an ornamental design having curved or irregular outlines, would equally permit of the application of the invention to the purposes herein set forth.

The general construction and application of the device is as follows:—The head piece A, with its hole B for suspending it, forms the upper part of the convertible strip. This may be sub-divided by slitting into any desired number of bands called outer strips, as $A^1$, and inner strips, as $A^2$. In Fig. 1 these strips appear of equal length, and are pierced lengthwise with a series of holes C, used for attachment purposes. The series are arranged to permit of the proper adjustment of the strips to the desired curvature, so that a framed object may be set at any suitable angle, as shown in Fig. 5. In Figs. $1^b$ and $1^d$ the strips $A^1$ and $A^2$ are varied in length and shape: in the former the inner strips $A^2$ are the shorter, and in the latter the outer strips $A^1$ are the shorter. This construction provides for the creation of return ends $A^3$, which serve a twofold purpose, namely, the lapping or bending over of the return parts when it is desired to obtain a looped formation, as in Figs. 6 and 7 and 7ª, and also the coincidence of the holes C when the lapping is done, as seen in Figs. 7 and 7ª. A further use for the return ends is shown in Figs. 2 and 5, they being bent around the frame D, which permits of the securing screws being used on the edge, out of line with the back screws. The disposition of the outer and inner strips, $A^1$ and $A^2$, termed multiplicate strips, may be carried out in almost endless variety. In some instances the inner strips $A^1$ may be bent upward behind the head piece A, as in Figs. 1ª, $1^c$, 2, and 3, and then again these strips may be used in the downward position, as in Figs. $1^e$ and 4, hence I do not confine myself to one particular mode of applying the strips, nor to the number of such used in combination.

In cases where the upwardly or diagonally bent strips are folded behind the head piece A, additional strength and rigidity may be given by fastening the parts together with a suitable securing device, which may consist of a rivet, as shown in Figs. 2, 3, and 4, marked E, or the tongue and slit method may be employed. In larger forms of construction bolts would be serviceable.

To obtain the cross arrangement, as in the case of Figs. 3 and 4, the multiplicate strips are twisted or bent to the desired angle, as at F, close to the junction with the head piece. The peculiar construction of some articles to which the invention may be applied, as in Figs. 4 and 6 which respectively represent a plaque and a lamp, render it necessary to form the attachment by bending the parts which it is desired should clasp the article. These parts are marked G. With the lamp, the strips $A^2$ are formed into a loop H, which is secured as shown in Figs. 7 and 7ª.

By the use herein of the words "the primary feature of the invention consists in converting one or more strips of the flexible material into any desired number of strips or bands", it is to be understood that "one or more" refers either to the use of a single piece of material wherewith to produce the multiplicate strips, or to the use of a folded piece, by which the number of strips may be further increased. When thus folded, the head piece would be twice the ordinary thickness, but the multiplicate parts could be used as single strips, and whether the flexible material be used singly or folded, it is to be understood that I do not confine myself to the use of multiplicate strips of equal width only, as they may be arranged alternately broad and narrow, and moreover spaces may be formed between them by widening the slits, or by cutting out alternate strips. Side strips may be cut out to create gaps $A^4$ and to leave the head piece wider than the strip formation.

The head piece A may be bent hook shape, as $B^1$, to clasp a rod or wall attachment, I, thus either it or the hole B may be utilized when suspending the device.

Having now described my invention, what I claim as new and desire to secure by Letters Patent is:

1. A supporting device consisting of an integral piece of flexible metal divided from a point near one end to the other end, forming two pairs of tongues which are perforated at their ends and adapted to be bent in opposite directions, the undivided end of the said metal piece being provided with a perforation and forming a head piece substantially as set forth.

2. A supporting device consisting of two pairs of elongated parts and a perforated head piece integral therewith, these elongated parts being adapted to be bent in different directions or left parallel at will and perforated at their ends substantially as set forth.

3. A suspending device consisting of a perforated head piece and four flexible elongated parts integral therewith, these four parts being perforated at their ends and the two outer parts being longer than the inner pair of said parts and having their ends extended at right angles across the ends of the said inner pair when these parts are parallel substantially as set forth.

In testimony whereof, I have signed my name to this specification in the presence of two subscribing witnesses.

ARCHIBALD SIDDALL.

Witnesses:
JOHN JASPER STONE,
HARRY A. SMEDLEY.